WARRINER & BAKER.
Corn Husker.
No. 79,166.          Patented June 23, 1868.
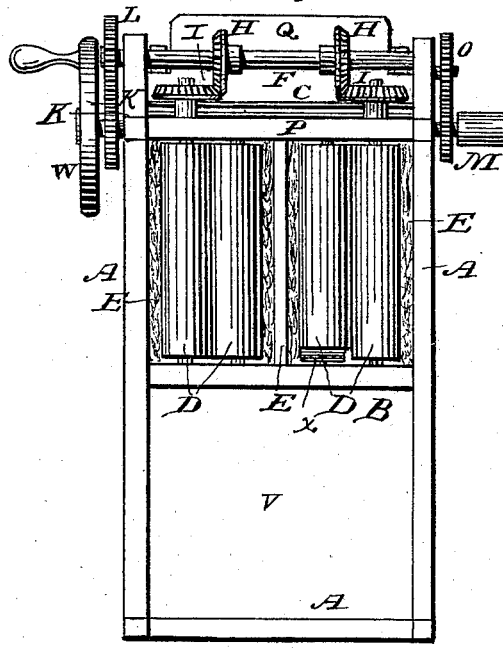
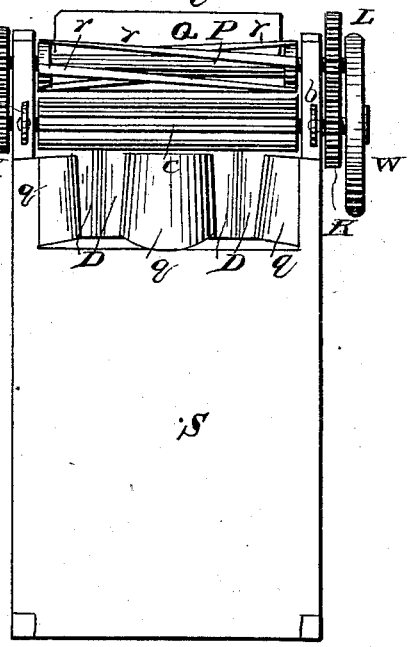
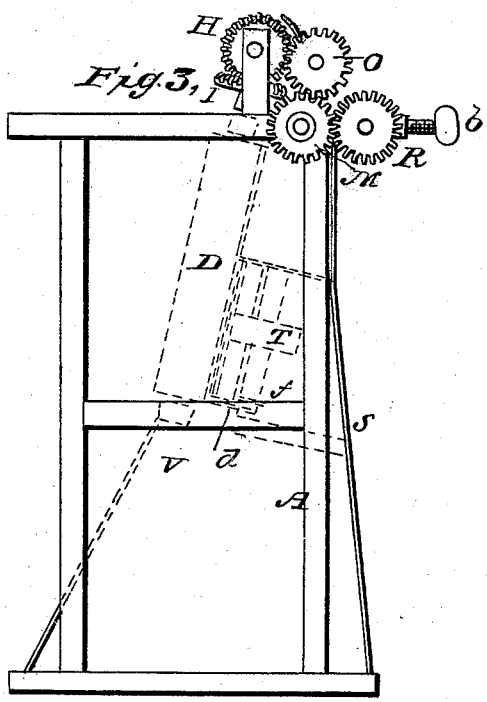
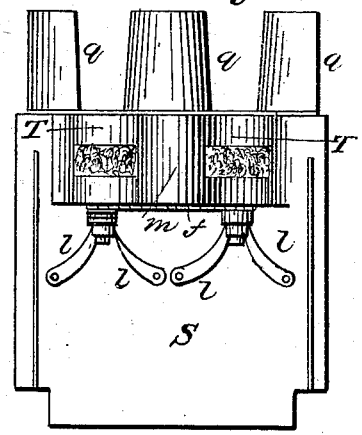
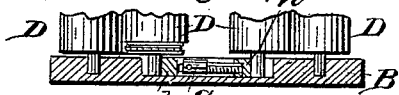

United States Patent Office.

R. WARRINER AND J. H. BAKER, OF SARATOGA SPRINGS, NEW YORK.

Letters Patent No. 79,166, dated June 23, 1868.

---

IMPROVEMENT IN CORN-HUSKER, STRAW AND STALK-CUTTER.

---

The Schedule referred to in these Letters Patent and making part of the same.

---

TO ALL WHOM IT MAY CONCERN:

Be it known that we, R. WARRINER and J. H. BAKER, of Saratoga Springs, in the county of Saratoga, and in the State of New York, have invented certain new and useful Improvements in Corn-Husker, and Hay, Straw, and Stalk-Cutter; and do hereby declare that the following is a full, clear, and exact description thereof, reference being had to the accompanying drawings and the letters of reference marked thereon.

In the annexed drawings, making a part of this specification—

Figure 1 represents a bottom, and

Figure 2 a top view of our machine when arranged for use.

Figure 3 represents a side view, showing the relative position of all the operative parts.

Figure 4 represents a bottom view of the adjustable lid S, and what is secured thereto; and Figure 5 represents the device for adjusting the rollers D D.

In the annexed drawings, A represents a frame, made of any required dimensions and material, and B B represent cross-bars framed thereto, and, in fact, forming a part of said frame.

The front cross-bar B is adjusted or made a little higher in the frame than the rear bar, as is shown.

D D represent rollers, made of any suitable material, and should be covered or cased with rubber, leather, or raw hide, or made entirely of either, as may be found most desirable.

These rollers D D have their bearings in the cross-bars B, and are arranged in pairs so as to work together and strip the husk off from the ear of corn after it has been broken from the stalk by means of the corrugated or fluted rollers C C, which will hereafter be more fully described.

At the front end of one of each pair of rollers D D, we secure a bevelled gear-wheel, I, which meshes with a corresponding gear-wheel, H, and receives motion therefrom.

One of the rollers D is provided with a groove, $x$, around its rear end, in which we adjust a band, $d$, which passes diagonally, thence to the shaft of one of the rolling brushes, T, and thus attaches them to the machine.

The rollers D D are adjusted at any desired distance from each other by means of the movable sockets $h\ h$, which are operated by means of the small screw $g$, made substantially in the form shown. Said screw, $g$, is provided with a series of holes around its stem, in which a small lever may be readily adjusted to turn the same any way desired.

The cross-bars B B are provided with suitable recesses or grooves, in which fit and work the movable sockets $h\ h$.

C C represent corrugated or fluted rollers, adjusted in and across the frame A, one above the other, and the top one regulated at any distance from the other by means of the set-screws $b\ b$.

The upper roller is adjusted in movable sockets, which work up and down in suitable slots in the frame therefor.

The bottom roller C has secured to one end of its shaft the fly and crank-wheel W and cog-wheel K, and at the other end the cog-wheel M and pulley N.

Power may be applied to the crank or pulley as may be desired.

The corrugated rollers C C are designed to crush the stalk and prepare it for food, and at the same time bite or pinch the ear of corn therefrom.

The cog-wheel K meshes with wheel L on one extremity of the shaft F, to which are also secured the bevelled gear-wheels H H.

P represents a shaft, adjusted across the frame A, just in front of the corrugated rollers C C, and is provided with collars around each end, to which we secure the revolving knives $r\ r$, as shown.

The shaft P has also fastened to one end of it the gear-wheel O, which meshes with and is operated by the gear-wheel M, which is fastened to the shaft of the lower roller C.

A stationary knife or true-edge plate is adjusted across the frame between the rollers C C and the knife-shaft P, for the purpose of affording a rest or cutting-face, so that the knives $r\ r$ may cut the material passed through the rollers C C.

Q represents a fender or apron, made of sheet metal, and adjusted between the knives $r\ r$ and the shaft F and its gear-wheels H H, for the purpose of protecting said wheels, and to conduct the cut feed over and away from the parts of this machine.

E E represent brushes, which are made of wool, tacked on to strips or blocks of wood, or of any suitable material, and which we adjust alongside and parallel with the rollers D D, for the purpose of keeping them clean and from filling or clogging up with the silk or husk of the corn.

S represents an adjustable lid, the front end of which is provided with suitable bevelled flanges and holes to form a hopper for the ears of corn to pass through upon the rollers D D, as seen at $g\ g$.

The under side of the lid S is provided with suitable bearings, for the brushes T to turn and work in. The bearings at one end are made by the straps or loops $l\ l$, as shown.

T T represent revolving brushes, made of any suitable material, and adjusted upon suitable shafts, which have their bearings on the under side of the lid S. These revolving brushes T T are operated by means of the band $d$ passing from one of the rollers D to the shaft of the brush. Any number of brushes may be operated or turned by having a connecting band, $f$, adjusted thereon, as is fully shown in the drawings.

The brushes T T are made in the form of and operate as a cam or eccentric-wheel, so as to turn and move the ear of corn after it has been broken from the stalk, and passed down on to the rollers D D.

$m$ represents a metallic plate, provided with holes, through which the brushes T pass and work, and made concave over each pair of rollers, so as to hold the ear of corn from being thrown or pushed aside by the said brushes. The plate $m$ is secured to and forms a part of the lid $s$.

It will be seen that this machine may be used simply as a husker by detaching the shaft P with its knives, $r\ r$, or simply as a hay or straw-cutter, by detaching the gear L from the wheel K, and running only the remaining parts, as may be desired, or the corn may be husked, the stalks crushed and cut up all at the same time.

We are aware that scrapers have been used at the sides of rollers for cleaning them.

What we claim is—

1. The arrangement of the brushes E E upon the sides of the leather-covered rollers D D, in the manner and operating as and for the purposes set forth.

2. The brushes T T in the plate $m$ on the under side of the lid S, to operate upon and with the rollers D D, as specified.

In testimony that we claim the foregoing, we have hereunto set our hands, this 11th day of March, 1868.

R. WARRINER,
J. H. BAKER.

Witnesses:
    A. A. YEATMAN,
    V. D. STOCKBRIDGE.